Patented Aug. 25, 1925.

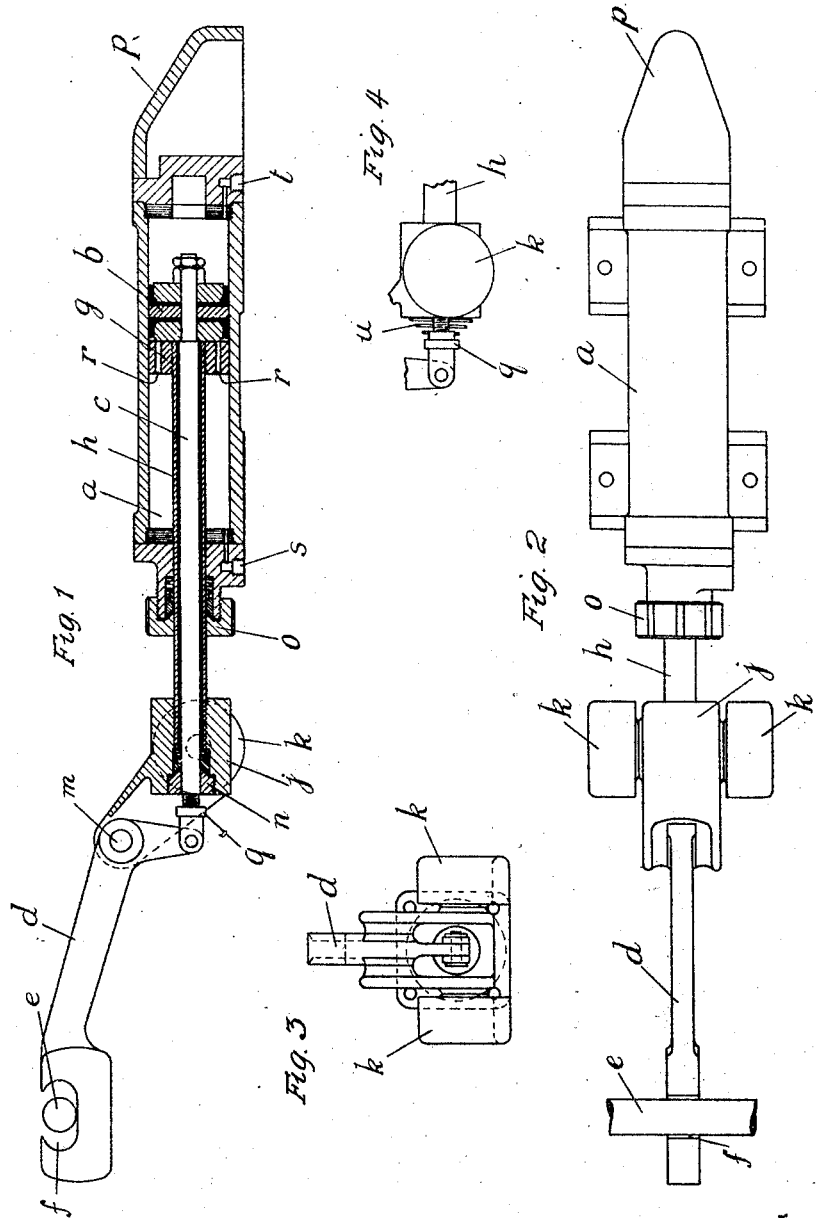

1,551,122

UNITED STATES PATENT OFFICE.

HENRY BERNARD SHEPPARD, OF DERBY, ENGLAND.

DEVICE FOR PLACING VEHICLES IN PREDETERMINED POSITIONS.

Application filed April 24, 1925. Serial No. 25,722.

*To all whom it may concern:*

Be it known that I, HENRY BERNARD SHEPPARD, of 6 the Strand, Derby, in the county of Derby, England, a subject of the King of Great Britain and Ireland, have invented certain new and useful Improvements in or Relating to Devices for Placing Vehicles in Predetermined Positions, of which the following is a specification.

This invention relates to devices for placing vehicles in predetermined positions.

The object of this invention is to provide apparatus for placing vehicles in required positions, as for example, on weigh-bridges, in tipplers or any other positions where they are required to be delivered and retained.

According to this invention a device for placing vehicles in predetermined positions is characterized by a vehicle engaging member pivoted to a movable fulcrum which is adapted to receive a reciprocating movement by a hollow piston rod working in a cylinder under the influence of a solid reciprocating rod mounted within the hollow rod, said solid piston rod being actuated by fluid pressure and having a certain free sliding movement within the hollow rod at the commencement of each reciprocation for operating the pivoted cranked member about its fulcrum so as to engage or disengage a vehicle.

Referring to the drawings filed herewith:—

Fig. 1 is a sectional elevation of one form of device made in accordance with this invention;

Fig. 2 is a plan;

Fig. 3 is an end elevation; and

Fig. 4 is a detail view.

$a$ is a fluid pressure cylinder, $b$ a piston therein having a solid piston rod $c$, the outer end of which is directly connected to a pivoted cranked lever $d$ adapted to engage and disengage the axle $e$ of a vehicle by a pocket $f$ as shown. $g$ is a secondary "dummy" piston with which is connected a hollow rod $h$ surrounding, except at the outer end, the solid rod $c$. The hollow rod $h$ is connected at its outer end to a carriage $j$ which runs on wheels or rollers $k$ carrying a fulcrum $m$ to which the cranked lever $d$ is pivoted. Suitable glands $n$ and $o$ are provided, one in the carriage and one at the cylinder front to prevent leakage of the pressure fluid. $p$ is a loose guard which may be provided at the rear end of the cylinder for preventing coupling or other hooks on the vehicles from fouling the apparatus. A collar $q$ is provided on the exposed outer end of the solid piston rod $c$ a suitable distance from the carriage $j$, this distance being the extent of a free sliding movement which the solid piston rod $c$ is allowed within the hollow piston rod $h$ in order to operate the cranked lever $d$ about its pivot at the commencement of each reciprocation, for example, in the position shown, the solid rod $c$ has commenced its outward reciprocation where its first movement has raised the cranked lever $d$ to engage the axle $e$ and piston $b$ has picked up the "dummy" piston $g$, whereupon the two travel outwards and move the carriage $j$ forward with the cranked lever $d$ still engaging the axle $e$. At the end of its movement, the axle abuts against the front of the recess $f$ and is brought to rest.

Ports $r$ are provided in the "dummy" piston $g$ and fluid pressure is admitted at the front of the cylinder through a port $s$ and at the rear through a port $t$.

On the return stroke, fluid pressure is admitted at the front end of the cylinder and passing through the ports $r$ in the "dummy" piston $g$ operates on the main piston $b$ first, thus causing the solid rod $c$ only to move and thereby operating the cranked lever so as to fall. When the collar $q$ engages the front of the carriage, the two pistons move inwards, thus drawing the carriage $j$ and lever $d$ back to their normal position ready for the next operation.

Arrangements for controlling the air admission and exhaust may be suitably made by valves external to the cylinder.

If desired, a suitable spring $u$ may be arranged to bear against the collar $q$ of the piston rod $c$, as shown in Fig. 3, and the front of the carriage $j$ in order to appreciably balance the weight of the cranked lever $d$ and prevent it from dropping away from the axle by the action of gravity when the fluid pressure supply is cut off and before the vehicle has come to rest. If the fluid pressure is cut off immediately the pistons reach the end of their stroke, the cranked lever, being rather heavy, may drop away from the axle a moment too soon and the provision of the spring will obviate this.

What I claim and desire to secure by Letters Patent is:—

1. A device for placing vehicles in predetermined positions comprising a vehicle engaging member, a fulcrum member having a pivotal mounting for said vehicle engaging member, means for reciprocating the fulcrum member and the vehicle engaging member together and means permitting an initial pivotal movement of the vehicle engaging member with respect to the fulcrum member, both of said means comprising pressure fluid operated devices.

2. A device for placing vehicles in predetermined positions comprising a vehicle engaging member, a fulcrum member having a pivotal mounting for said vehicle engaging member, a crank on the vehicle engaging member, a fluid pressure cylinder, a dual piston element reciprocating therein and connected to said crank and fulcrum member, means permitting an initial pivotal movement of the vehicle engaging member with respect to the fulcrum member.

3. A device for placing vehicles in predetermined positions comprising a vehicle engaging member, a fulcrum member having a pivotal mounting for said vehicle engaging member, a crank on the vehicle engaging member, a fluid pressure cylinder, a main piston and piston rod reciprocating therein under the action of fluid pressure and connected to said crank and slidable with respect to the fulcrum member, a dummy piston reciprocable in said cylinder under the influence of the main piston, a hollow piston rod connected to the dummy piston slidably surrounding the main piston rod and fixedly connected to the fulcrum member, an abutment member on said main piston rod adapted to engage said fulcrum member for limiting sliding movement of the main piston rod.

4. A device for placing vehicles in predetermined positions comprising a vehicle engaging member, a fulcrum member having a pivotal mounting for said vehicle engaging member, means for reciprocating the fulcrum member and the vehicle engaging member together, means for permitting an initial pivotal movement of the vehicle engaging member with respect to the fulcrum member, both of said means comprising fluid pressure operated devices, and means for restraining gravitational movement of the vehicle engaging member.

5. A device for placing vehicles in predetermined positions comprising a vehicle engaging member, a fulcrum member having a pivotal mounting for said vehicle engaging member, a crank on the vehicle engaging member, a fluid pressure cylinder, a main piston and piston rod reciprocating therein under the action of fluid pressure and connected to said crank and slidable with respect to the fulcrum member, a dummy piston reciprocable in said cylinder under the influence of the main piston, a hollow piston rod connected to the dummy piston slidably surrounding the main piston rod and fixedly connected to the fulcrum member, an abutment member on said main piston rod adapted to engage said fulcrum member for limiting sliding movement of the main piston rod, and means for restraining gravitational movement of the vehicle engaging member.

6. A device for placing vehicles in predetermined positions comprising a vehicle engaging member, a fulcrum member having a pivotal mounting for said vehicle engaging member, a crank on the vehicle engaging member, a fluid pressure cylinder, a main piston and piston rod reciprocating therein under the action of fluid pressure and connected to said crank and slidable with respect to the fulcrum member, a dummy piston reciprocable in said cylinder under the influence of the main piston, a hollow piston rod connected to the dummy piston slidably surrounding the main piston rod and fixedly connected to the fulcrum member, an abutment member on said main piston rod adapted to engage said fulcrum member for limiting sliding movement of the main piston rod, and means for restraining gravitational movement of the vehicle engaging member, said means comprising a resilient medium located between the abutment member and the fulcrum member.

In testimony whereof I affix my signature.

HENRY BERNARD SHEPPARD.